Feb. 18, 1958

W. MOORE, JR 2,823,862

ELECTRICAL PROPORTIONAL CONTROL APPARATUS
EMPLOYING A FREQUENCY DISCRIMINATOR

Filed Nov. 28, 1952

INVENTOR.
WARREN MOORE JR.

BY Arthur H. Swanson

ATTORNEY.

United States Patent Office 2,823,862

Patented Feb. 18, 1958

2,823,862

ELECTRICAL PROPORTIONAL CONTROL APPARATUS EMPLOYING A FREQUENCY DISCRIMINATOR

Warren Moore, Jr., Philadelphia, Pa., assignor to Minneapolis-Honeywell Regulator Company, Minneapolis, Minn., a corporation of Delaware Application November 28, 1952, Serial No. 323,070

16 Claims. (Cl. 236—78)

It is a general object of the present invention to provide improvements in apparatus for changing an input mechanical motion into an electrical output proportional to the input mechanical motion. More specifically, the invention is directed to an improved transducing mechanism which incorporates a sensitive frequency discriminator, the output signal of which is a direct current of reversible polarity proportional to the frequency of a tuned oscillator.

In automatic process control, it is often necessary to provide controllers which will quickly respond to minute changes in a variable and provide a control signal for maintaining the variable at its desired value. As the control signal may have to be transmitted some distance, it is often desirable to use electrical means for the transmission of the control signal. One method of accomplishing this end is by adjusting the frequency of an oscillator in accordance with the changes in magnitude of a variable. The frequency changes may be detected by suitable means and be converted into a direct current output signal which is readily transmitted for some distance. In order to meet the rigid requirements of present day controls, conversion to a direct current signal must be accurate, with the frequency control circuits and the small changes in frequency providing large, accurately corresponding changes of output signal.

It is accordingly an object of the present invention to provide a new and improved electrical transducing apparatus, characterized by its response to minute electrical frequency changes.

A further object of the invention is to provide a new and improved electrical transducing apparatus having a variable frequency source and frequency discriminating means for producing a direct current proportional to frequency changes.

A still further object of the present invention is to provide a new and improved frequency discriminator circuit for use in electrical transducing apparatus.

Another object of the present invention is to provide a new and improved frequency discriminator having a pair of electronic devices energized by a variable frequency source with one of the devices controlled by a frequency selective circuit.

The various features of novelty which characterize the invention are pointed out with particularity in the claims annexed hereto and forming a part of this specification. For a better understanding of the invention, however, its advantages, and specific objects obtained with its use, reference should be had to the accompanying drawings and descriptive matter in which is illustrated and described a preferred embodiment of the invention.

Figure 1:
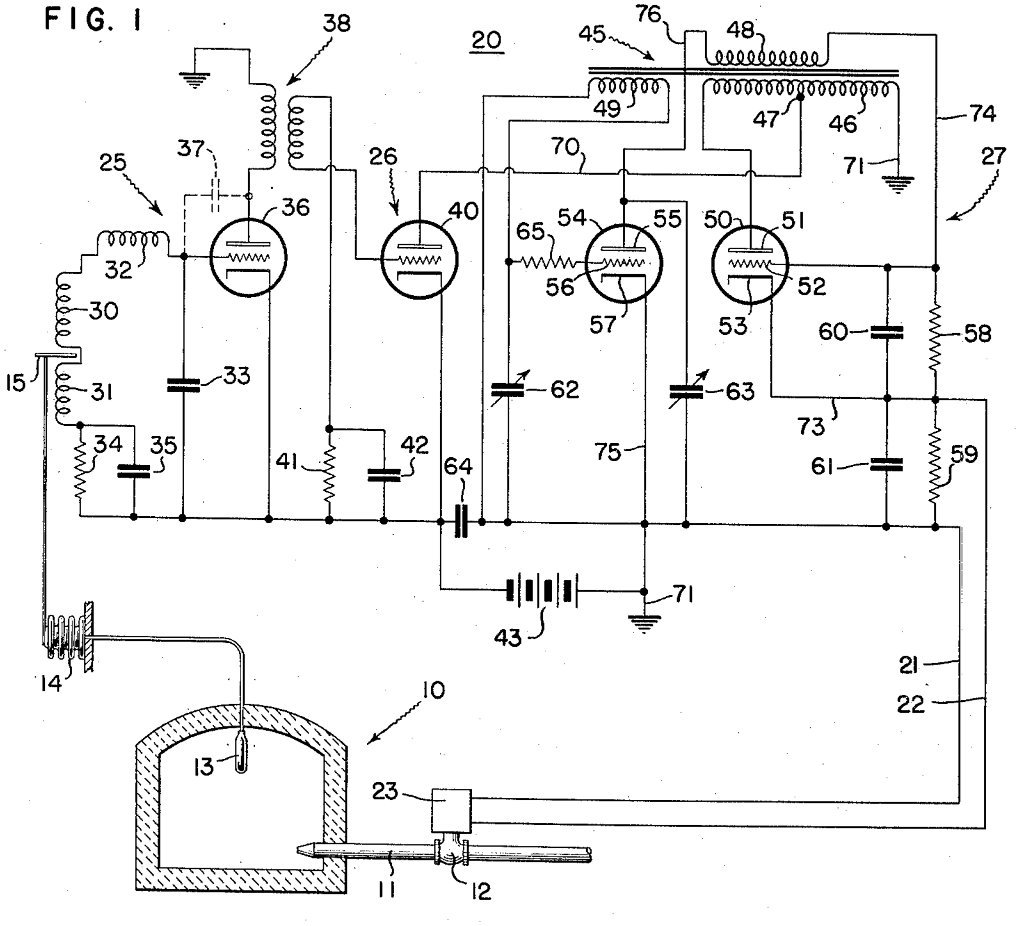
Figure 2:
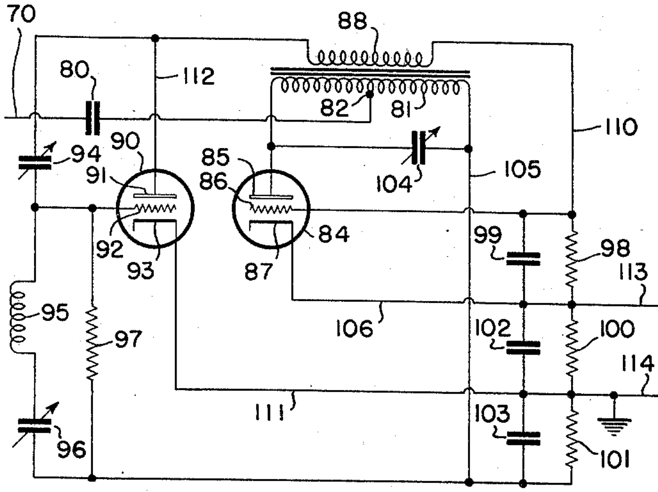

Fig. 1 is a schematic showing of one form of the invention as it may be applied to a process control; and Fig. 2 is a modified form of the frequency discriminator portion of the present apparatus.

Referring now to Fig. 1, the numeral 10 represents a furnace whose temperature is to be controlled or regulated. For supplying a heating medium to the furnace, there is provided an intake conduit 11 having an electrical control valve 12 therein. A temperature sensitive element 13, which may be in the form of a liquid filled sensor, is positioned within the furnace and is arranged to have its pressure changes reflected to a bellows 14.

Movement of the bellows 14 is transmitted to an adjustable vane 15, with the motion of the vane being translated by an electrical apparatus 20 into a direct current signal, which signal will appear upon the output lines 21 and 22 to regulate the operation of the actuator 23 of valve 12.

The electrical apparatus 20 comprises 3 major components, starting with a tuned plate, tuned grid oscillator section 25, an amplifier section 26, and a frequency discriminator section 27. The input grid circuit for the tuned plate, tuned grid oscillator section 25 includes a pair of coils 30 and 31 whose inductance is arranged to be varied by the position of the vane 15 relative thereto. Also included is a further inductive device 32, a tuning condenser 33, a resistor 34, and a bypass condenser 35. This input section is connected to a control electrode controlled electronic device 36 which has a predetermined plate to grid capacity 37. The output of the electronic device 36 is fed through an output transformer 38 to the input control electrode of a further electronic amplifying device 40 of the section 26. Also associated with the input of the device 40 is a parallel connected resistor 41 and condenser 42. The power supply for both the electronic devices 36 and 40 is a battery 43.

The frequency discriminator section 27 includes an input supply transformer 45 which has an input winding 46 which is in the form of an auto-transformer winding having a tap at 47. This tap is positioned so as to give the desired impedance matching with the output of amplifier 26. Coupled to the winding 46 is a further winding 48 and a winding 49. This winding 48 is preferably wound in bifilar relation to winding 46 so that the two windings appear as one, from the alternating current standpoint, with two direct current paths. Arranged to be energized by the winding 46 is a control electrode controlled electronic device 50 having an anode 51, a control electrode 52, and a cathode 53.

Arranged to be energized by the winding 48 is a further control electrode controlled electronic device 54 having an anode 55, a control electrode 56, and a cathode 57. Connected in the output circuit of the device 54 is a pair of series connected resistors 58 and 59, with a pair of condensers 60 and 61 connected in parallel with the respective resistors.

Connected between the control electrode 56 of the electronic device 54 and the cathode 57 is an adjustable capacitor 62, while a further adjustable capacitor 63 is connected between the anode 55 and the cathode 57. The capacitor 63 serves to tune the transformer 45 to the desired frequency range. A blocking capacitor 64 is connected to the cathode of the electronic device 40 to isolate the direct current in the amplifier section 26 from the discriminator section 27. A grid circuit limiting resistor 65 is connected to the input control electrode 56 of the device 54.

Concerning the operation of the apparatus shown in Fig. 1, let it first be assumed that the apparatus is in a so-called balanced state. In other words, the temperature within the furnace 10 is at the desired value, and there is no need for a change. Under these conditions, the vane 15 will be in a central position between the coils 30 and 31, and the oscillator 25 will be operating at a predetermined frequency. This frequency may be in the vicinity of approximately 100,000 cycles, or possibly higher.

The selection of a lower frequency in Fig. 1 is desirable in that there will be a signal loss on the input of the device 54, due to the input impedance becoming low compared to the size of the resistor 65, when high frequencies are used.

The alternating current signal generated by the oscillator 25 is passed through the transformer 38 into the amplifier section 26 where the signal is amplified to a desired value. The output of this amplifier is in turn fed to the right-hand section of the input winding 46 of the transformer 45. The electron current flow for this may be traced from the left-hand terminal of the battery 43 to the electronic device 40, conductor 70, tap 47, the right-hand portion of the input winding 46, and ground connection 71 back to the right-hand terminal of the battery 43. As the signal flowing in the right-hand section of the winding 46 will be primarily an alternating current signal, there will be a voltage appearing across the entire winding 46, due to the winding acting as an autotransformer. This will apply a voltage to the anode 51 of the electronic device 50 so that there will be a tendency for current to flow through this circuit. During the positive half cycle of operation, when the anode 51 is positive relative to the cathode 53, there will be a current flow through the device 50, and this electron current flow circuit may be traced from the ground terminal 71 through resistor 59, conductor 73, cathode 53, anode 51, and winding 46 back to the ground connection 71. As the tube 50 will conduct only every other half cycle, there will be a pulsating direct current flowing through the resistor 59, and this pulsating current will be filtered by the action of the condenser 61 so that there is effectively a direct current appearing across the resistor 59. As the winding 48 is coupled to the winding 46, it will also have a supply voltage available for the electronic device 54. In this instance, an electron current flow can be traced through the electronic device 54 from a point originating on the right-hand terminal of the winding 48 through conductor 74, resistor 58, resistor 59, conductor 75, cathode 57, anode 55, and conductor 76 to the left-hand terminal of the winding 48.

It will be noted that the current flow in the last traced circuit of the electronic device 54 passed through the resistor 58. The voltage drop across the resistor 58 serves as a biasing voltage for the electronic device 50 and, at the resonant frequency of the apparatus, this biasing voltage is arranged to be of such magnitude as will cause the current flow through the device 50 to be equal to the current flow through the device 54. The current flow through the device 54 is regulated by the signal on the control electrode 56, and this in turn will be dependent upon the signal produced in the winding 49 and the manner in which the winding 49 resonates with the condenser 62. If this resonant circuit is tuned to the frequency of the input frequency, the signal applied to the control electrode 56 will be displaced 90 electrical degrees from the voltage applied to the anode 55. Under these circumstances the electronic device 54 will be conducting approximately ¼ of each cycle of the input frequency. The conduction of the device 54 and the resultant voltage drop across the resistor 58 is such as to cause the average current flow from the device 50 to be equal to the average current flow from the device 54.

Noting again the above electron current flow paths for both of the devices 50 and 54, it will be noted that their directions of passage through the resistor 59 will be in opposite directions so that, in the event that both of the current flows are equal, the net output voltage on the conductors 21 and 22 will be zero.

In the event that there should be a change in the variable temperature within the furnace 10, the vane 15 will be displaced by the bellows 14, and the frequency of oscillation of the oscillator 25 will change. This change in frequency will be reflected through the amplifier 26 to the discriminator section 27. With the change in frequency applied to the resontant circuit on the input of the electronic device 54, the control signal will either advance in phase or lag in phase from the resonant condition assumed above where the control electrode potential was 90 degrees out of phase with the voltage applied to the anode 55.

With a signal of such frequency that there is an increase in the phase displacement, there will be a resultant decrease in the amount of current flow to the electronic device 54. This will result in a decrease in the amount of bias on the electronic device 50 so that the net effect is that there will be a current flow through the resistor 59 which will appear on the output. As long as the frequency of the oscillator 25 remains displaced from its central frequency so that there is an increased phase difference between the signal on the control electrode 56 and that of the anode 55, the current flow through the resistor 59 will be of a polarity indicating that the current flow to the electronic device 50 is dominating. This polarity will be such that the output conductor 22 will be positive relative to the output conductor 21.

In the event that the condition within the furnace 10 should change in the opposite direction, the phase displacement between the control signal on the control electrode 56 and that on the anode 55 will have decreased, so that now the electronic device 54 will be conducting more and will supply a larger biasing signal to the electronic device 50, so that this device will conduct less. As a result, the polarity of the direct current output signal on the resistor 59 and the leads 21 and 22 will reverse from that discussed above so that now the lead 21 will be positive and the lead 22 negative.

It will be readily noted that the set point of the apparatus may be changed by changing the tuning of the apparatus. This tuning is preferably done by first tuning the oscillator 25 to the desired frequency by positioning the vane 15 in the desired position and adjusting condenser 33. Condenser 63 is then tuned to give a maximum current in the current flow circuits of devices 50 and 54. Following this, condenser 62 is tuned to balance the current flowing through the circuits for devices 50 and 54. It will be obvious that a set point adjustment can also be made of the mechanical input as concerns the relative association of the vane 15 with respect to the bellows 14. It will also be obvious that, with the particular polarity on the output conductors 21 and 22, the actuator 23 for the valve 12 will drive the valve 12 in a direction to eliminate a deviation in the temperature in the furnace 10.

Considering now Fig. 2, there is shown here a modified form of a frequency discriminator. In this particular figure, the apparatus is arranged so that the anode-control electrode capacity is made a part of the input resonant circuit to one of the electronic devices.

More specifically, the apparatus in Fig. 2 will be energized by an amplifier corresponding to the amplifier 26 through a coupling condenser 80. The energizing signal is fed to an input transformer winding 81 at a tap 82. In this arrangement, there is provided an electronic device 84 having an anode 85, a control electrode 86, and a cathode 87 which are arranged to receive an energizing voltage from the winding 81. Coupled to the winding 81 and wound in bifilar relation thereto is a further winding 88, and this winding is a supply source for a further electronic device 90 which has an anode 91, a control electrode 92, and a cathode 93. Associated with the input of the electronic device 90 is a series resonant circuit comprising an adjustable condenser 94, an inductor 95, and a condenser 96. In parallel with the last mentioned inductor 95 and the condenser 96 is a resistor 97.

Associated with the input of the device 84 is a resistor 98 with a filtering condenser 99 connected in parallel therewith. Also connected in a series circuit with the resistor 98 is a further pair of resistors 100 and 101, each of which has connected in parallel therewith a respective one of filtering condensers 102 and 103. Connected across the winding 81 is an adjustable condenser 104 which serves to tune the windings 81 and 88 to the desired frequency.

In considering the operation of Fig. 2, it will be assumed that the basic apparatus shown in Fig. 1 including the furnace 10 and its associated sensing and control elements are present in the combination. It will also be assumed that the oscillator 25 and amplifier 26 are producing an output signal which will be applied through the condenser 80 to the input winding 81. The voltage produced across the winding 81 will supply directly an energizing voltage to the electronic device 84, and the circuit for electron current flow to the device 84 may be traced from the right-hand end terminal of the winding 81 through conductor 105, resistors 101 and 100, conductor 106, cathode 87, and anode 85, back to the left-hand end terminal of the winding 81. The current flow through the electronic device 90 is derived from the secondary winding 88, energized from the winding 81, and there will be a resultant electron current flow through the winding 88 and electronic device 90 which may be traced from the right-hand end terminal of the winding 88 through conductor 110, resistors 98 and 100, conductor 111, cathode 93, anode 91, and conductor 112 back to the left-hand end terminal of the winding 88.

It will be noted from the above traced current flow paths that the current flow through the resistor 100 due to the electronic device 90 is in the direction opposite that from the electronic device 84. It will also be noted that the current flow from the device 90 through the resistor 98 will produce a voltage drop which will be applied as a biasing signal to the device 84. In this way, at the resonant frequency, the device 84 will be conducting a current which will average to be the same as that from the device 90. In this particular arrangement, the input circuit for the electronic device 90 is arranged to be series resonant by the inductance 95 and condenser 96 so that, with the series resonant circuit and the resonant frequency present on the circuit, there will be a predetermined current flow through the device 90. There will also be a certain amount of biasing action from the current flow from the electronic device 84 as it flows through the resistor 101. The combined actions of these two biasing voltages tend to stabilize the two electronic devices in a balanced condition. In the event that the input frequency should decrease, the input circuit to the electronic device 90 will become capacitive in nature and the voltage on the control electrode will be in phase with the voltage on the anode so that the device 90 will conduct more. With the greater conduction in the device 90 there will be a decrease in the conduction of the device 84, due to the biasing action of the resistor 98, and with one device conducting more than the other there will be an output signal across the resistor 100, with conductor 113 being negative with respect to the conductor 114. In the event that the frequency should go above the resonant frequency, the input circuit will then be primarily inductive and the device 90 will conduct less, as the input signal will be out of phase with the signal on the anode 91. This out of phase signal will reduce the current flow in the device 90, which will also result in the reducing of the biasing action on the device 84. With this reversal in the conductivity condition of the devices, the output polarity will be such that the conductor 113 will be positive with respect to the conductor 114.

The frequency of operation of the circuit of Fig. 2 may be higher than that of Fig. 1 in that, in design, it is possible to include the input impedance of the tube 90 as a part of the tuned circuit on the input of the tube. The tuning to the operating frequency may be done in the manner set forth with respect to Fig. 1.

While, in accordance with the provisions of the statutes, there have been illustrated and described the best forms of the invention known to me, it will be apparent to those skilled in the art that changes may be made in the form of the apparatus disclosed without departing from the spirit of the invention as set forth in the appended claims, and that in some cases certain features of the invention may be used to advantage without corresponding use of other features.

Having now described the invention, what it is desired to secure by Letters Patent is as follows:

1. In an electrical controller, the combination comprising, a tuneable oscillator, a pair of current output amplifier circuits arranged to pass their main load circuit output currents in opposing relation through a common output impedance, one of said circuits having a tuned input circuit which has a predetermined resonant relation to an output of said tuneable oscillator, and means connecting said oscillator in driving relation to said amplifier circuits and to said input circuit so that changes in frequency of said oscillator will cause changes in the output of at least one of said amplifier circuits and changes in the output current flow through said common output impedance.

2. An electrical controller comprising, a variable frequency oscillator, a pair of circuits arranged to be energized by the output of said oscillator, an output load impedance across which an output direct current signal appears connected as a common element to said pair of circuits, said connections being arranged so that the current output from one of said pair of circuits flows through said load impedance in opposition to that of the other of said pair of circuits, and a frequency selective circuit connected to one of said pair of circuits to regulate the current flow in accordance with the frequency of said oscillator.

3. An electrical controller comprising, a variable frequency oscillator, a pair of circuits arranged to be energized by the output of said oscillator, an output load impedance across which an output direct current signal appears connected as a common element to said pair of circuits, said connections being arranged so that the current output from one of said pair of circuits flows through said load impedance in opposition to that of the other of said pair circuits, and a series resonant circuit connected to one of said pair of circuits to regulate the current flow in said circuit and said load impedance in accordance with the frequency of said oscillator.

4. Electrical frequency discriminator apparatus comprising, a transformer having an input winding, an auxiliary winding inductively coupled to said transformer input winding, an input circuit connection to said transformer input winding, said input circuit connection originating from a source of variable frequency, first and second electron discharge devices, means connecting said first device in energized relation to said transformer input winding, means connecting said second device in energized relation to said auxiliary winding, an output circuit for each of said devices including an impedance which is common to both of said devices, and frequency selective means connected to one of said devices to vary the current flow therethrough as well as through said impedance as the frequency of said input circuit varies.

5. Electrical frequency discriminating apparatus comprising, a transformer having an input winding, an auxiliary winding inductively coupled to said transformer input winding, an input circuit connection to said input winding, said input circuit connection originating from a source of variable frequency, first and second electron discharge devices, means connecting said first device in energized relation to said transformer input winding, means connecting said second device in energized relation to said auxiliary winding, an output circuit for each of said devices including an impedance which is common to both of said devices, a further auxiliary winding coupled to said transformer input winding, tuning means connected to said further winding, and means connecting said further winding and said tuning means to the input of one of said devices.

6. An electrical proportional controller comprising, a movable sensing element adapted to be proportionally moved in accordance with the magnitude of a variable, a variable frequency oscillator, means controlled by said element arranged to vary the frequency of said oscillator by tuning said oscillator, a frequency discriminator electronically coupled to said oscillator, said discriminator having a single output impedance through which a direct current flows to produce thereon a signal proportional to said element movement, and a controller connected to said impedance for regulating a variable affecting said element.

7. Apparatus as set forth in claim 6 wherein said frequency discriminator comprises a pair of control electrode controlled electronic devices arranged to be energized by said oscillator with one of said devices having a frequency selective circuit connected to its associated control electrode and the output currents of said pair flow in opposition through said output impedance.

8. An electronic controller comprising, a variable frequency oscillator, a pair of tuning coils for said oscillator, a vane arranged for positioning between said coils and positioned by a condition responsive device, an amplifier connected to an output of said oscillator, an output circuit for said amplifier including a transformer input winding, a first control electrode controlled electronic device energized by said transformer input winding, an auxiliary winding electrically coupled to said transformer input winding, a second control electrode controlled electronic device energized by said auxiliary winding, a common output impedance connected to both of said electronic devices so that the current flow therethrough from said devices is in opposition, a frequency selective circuit connected to the control electrode of one of said devices so that said one device has its conduction varied with respect to the other in accordance with variations in the frequency variations of said oscillator, and a controller connected to said common output impedance for affecting the variable controlling the operation of said responsive device.

9. An electronic controller comprising, a variable frequency oscillator, tuning means for said oscillator arranged to be positioned by a variable responsive device, an amplifier connected to an output of said oscillator, an output circuit for said amplifier including a portion of a transformer having an input winding, a first control electrode controlled electronic device energized by said transformer input winding, an auxiliary winding electrically coupled to said transformer input winding, a second control electrode controlled electronic device energized by said auxiliary winding, a common output impedance connected to both of said electronic devices, alternating current shunting means connected to said output impedance so that a current which is primarily direct appears across said impedance, a frequency selective circuit connected to the control electrode of one of said devices so that said one device has its conduction varied with respect to the other in accordance with variations in the frequency variations of said oscillator, and a direct current controller for affecting the variable controlling the operation of said variable responsive device.

10. In electrical apparatus having a frequency discriminator, the combination comprising, a pair of control electrode controlled electronic devices, a transformer having a pair of windings, one of which is connected to a signal source of varying frequency and connected to energize one of said electronic devices and the other of which is connected to energize the other of said electronic devices, an output circuit for said one electronic device, an output circuit for said other electronic device, circuit means connecting the control electrode of one of said devices to the output of the other of said devices, an output impedance which is connected as a common element in both of said output circuits, and a frequency selective circuit connected to said source and to the control electrode of the device not having its control electrode connected to an output circuit.

11. Apparatus as set forth in claim 10 wherein said frequency selective circuit comprises a series connected inductive element and condenser.

12. Apparatus as set forth in claim 10 wherein said frequency selective circuit comprises a transformer winding coupled to said source and a condenser connected in series therewith.

13. In electrical apparatus having a frequency discriminator, the combination comprising, a pair of control electrode controlled electronic devices, a transformer having a pair of windings, one of which is connected to a signal source of varying frequency and connected to energize one of said electronic devices and the other of which is connected to energize the other of said electronic devices, an output circuit for said one electronic device, an output circuit for said other electronic device, circuit means connecting the control electrode of one of said devices to the output of the other of said devices, three series connected impedances two of which are connected in the separate output circuits of said electronic devices and the other of which is connected as a common element in said output circuits, and a frequency selective circuit connected to said source and to the control electrode of the device not having its control electrode connected to an output circuit.

14. Electrical frequency discriminating apparatus comprising, a transformer arranged for connection to a variable frequency source, said transformer comprising an input winding and an output winding which are wound in bifilar relation to each other to present a single impedance to alternating current and two paths for direct current, means for tuning said transformer, first and second control electrode controlled electronic devices arranged for energization by said transformer with one of said devices energized by said input winding and the other of said devices energized by said output winding, a direct current output for each of said devices through said transformer windings and including an impedance which is common to both of said devices, and frequency selective means connected to one of said devices to vary the conduction thereof relative to the conduction of the other of said devices.

15. Electrical control apparatus comprising, a pair of input terminals to which there is adapted to be applied an alternating current variable in frequency in accordance with the changes in a variable condition, a pair of output circuits connected to be energized by the alternating current applied to said terminals, an output impedance common to said output circuits and so arranged that the current flow from said circuits passes in opposite directions therethrough, said output impedance having a direct current signal thereon indicative of the magnitude of the variable condition, and a tuned frequency sensitive circuit operatively connected to one of said output circuits, said frequency sensitive circuit being operative to modify the response of said one output circuit and thereby the current flow of said one output circuit through said common impedance in accordance with changes in the frequency of said applied alternating current.

16. Electrical control apparatus comprising, a pair of input terminals to which there is adapted to be applied an alternating current variable in frequency in accordance with the changes in a variable condition, a pair of output circuits connected to be energized by the alternating current applied to said terminals, an output impedance common to said output circuits and so arranged that the current flow from said circuits passes in opposite directions therethrough to produce a direct current thereon proportional to the magnitude of said variable condition, and a tuned frequency sensitive circuit operatively associated with one of said output circuits and operative to modify the current flow of said one output circuit through said common impedance in accordance with changes in the frequency of said applied alternating current.

References Cited in the file of this patent

UNITED STATES PATENTS

| | | |
|---|---|---|
| 2,156,534 | Hyland | May 2, 1939 |
| 2,316,317 | Curtis | Apr. 13, 1943 |
| 2,411,247 | Cohen | Nov. 19, 1946 |
| 2,413,913 | Duke | Jan. 7, 1947 |
| 2,561,182 | Crane | July 17, 1951 |
| 2,564,937 | Wannamaker | Aug. 21, 1951 |